United States Patent
Fan et al.

(10) Patent No.: US 8,412,221 B2
(45) Date of Patent: Apr. 2, 2013

(54) METHOD FOR INTERFERENCE MITIGATION FOR FEMTOCELL BASE STATIONS OF A WIMAX NETWORK

(75) Inventors: Linghang Fan, Surrey (GB); Jun Zhou, London (GB); Andreas Maeder, Heidelberg (DE); Tetsu Ikeda, Miyamae-kuKawasakiKanagawa (JP)

(73) Assignees: NEC Europe Ltd., Heidelberg (DE); NEC Corporation, Tokyo (JP)

( * ) Notice: Subject to any disclaimer, the term of this patent is extended or adjusted under 35 U.S.C. 154(b) by 58 days.

(21) Appl. No.: 13/144,615

(22) PCT Filed: Jan. 14, 2010

(86) PCT No.: PCT/EP2010/000163
§ 371 (c)(1),
(2), (4) Date: Aug. 11, 2011

(87) PCT Pub. No.: WO2010/081696
PCT Pub. Date: Jul. 22, 2010

(65) Prior Publication Data
US 2011/0287775 A1    Nov. 24, 2011

(30) Foreign Application Priority Data
Jan. 14, 2009 (EP) ..................................... 09250082
Jul. 6, 2009 (EP) ..................................... 09251739

(51) Int. Cl.
*H04W 72/00*    (2009.01)
(52) U.S. Cl. .................. 455/452.1; 455/450; 455/422.1; 455/522

(58) Field of Classification Search ............... 455/452.1, 455/450, 422.1, 522
See application file for complete search history.

(56) References Cited

U.S. PATENT DOCUMENTS

| | | |
|---|---|---|
| 2005/0148368 A1 | 7/2005 | Scheinert et al. |
| 2007/0097939 A1 | 5/2007 | Nylander et al. |
| 2007/0213086 A1 | 9/2007 | Claussen et al. |
| 2010/0167778 A1* | 7/2010 | Raghothaman et al. ...... 455/522 |

FOREIGN PATENT DOCUMENTS

| | | |
|---|---|---|
| JP | 200817382 A | 1/2008 |
| WO | 2007040453 A2 | 4/2007 |

OTHER PUBLICATIONS

NTT DoCoMo: "Clarification of functions for self-optimization and self-configuration", 3rd Generation Partnership Project (3GPP); Technical Specification Group (TSG) Radio Access Network (RAN); Working Group 3 (WG3), No. R3-061509, Oct. 13, 2006, pp. 1-3, XP002477484.

(Continued)

*Primary Examiner* — Nghi H Ly
(74) *Attorney, Agent, or Firm* — Young & Thompson

(57) ABSTRACT

A method for interference mitigation for femtocell base stations of a WiMAX network, wherein the femtocell base station is located within the transmission range of at least one macrocell base station and/or at least one other femtocell base station, is characterized in that the femtocell base station performs downlink measurements to detect neighboring macrocell and/or femtocell base stations and reports results of the downlink measurements to at least one higher layer network controller, wherein the network controller allocates transmission parameters to the WiMAX femtocell base stations on the basis of at least the reported measurement results and the current resource occupation in the network.

17 Claims, 4 Drawing Sheets

OTHER PUBLICATIONS

Figure 1:
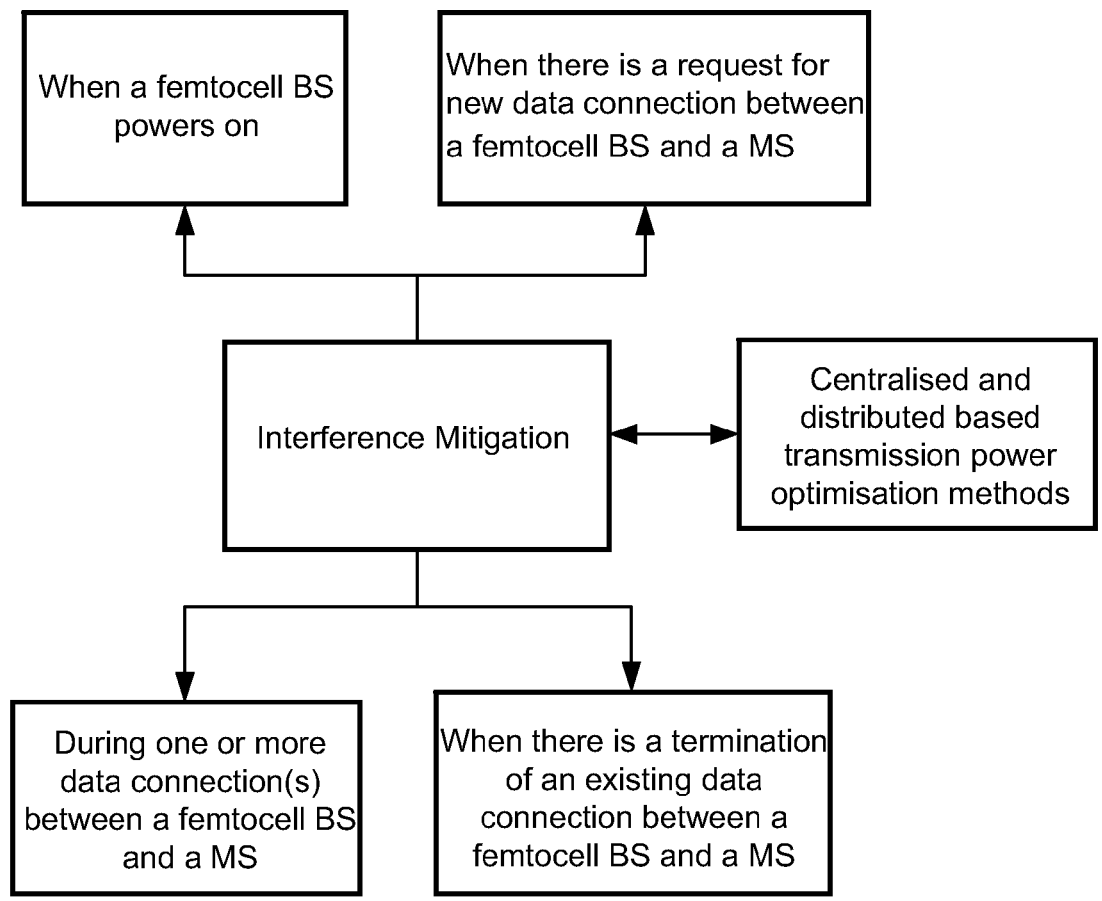

Anton A, et al.: Self-configuration and self-optimization of 4G Radio Access Networks (IEEE C802. 16m-07/169), IEEE 802.16, [Online] Aug. 29, 2007, pp. 1-9, XP002565296, Retrieved from the Internet: URL: ieee802.org/16>, [retrieved on Jan. 26, 2010], Radio network self-configuration; p. 5, line 3-p. 6, line 2 Radio network self-optimization; p. 6, line 3-p. 7, line 8.

International Search Report, dated Apr. 26, 2010, from corresponding PCT application.

Translation of Japanese Office Action, dated Dec. 18, 2012, from corresponding JP application.

* cited by examiner

METHOD FOR INTERFERENCE MITIGATION FOR FEMTOCELL BASE STATIONS OF A WIMAX NETWORK

The present invention relates to a method for interference mitigation for femtocell base stations of a WiMAX network, wherein said femtocell base station is located within the transmission range of at least one macrocell base station and/or at least one other femtocell base station.

There is currently an interest from mobile network operators to deploy so called femtocell base stations (also known as home base stations, home BTS, picocells, home NBs, femto access points (FAPs), or femto radio base stations) which would be installed within the homes of the operators' customers (see for reference Airvana whitepaper, "Femtocells: Transforming The Indoor Experience"). Such femtocells, currently being developed and standardized for both 3G and 4G networks, are scaled-down low-cost mobile base stations with low transmit power. Installation of femtocell BSs will typically be handled by the customers themselves without any technical training, therefore it has to be a simple plug-and-play procedure. Femtocell base stations are similar to WiFi Access Points, but the radio interface is based on wide area cellular network standards such as WiMAX (Worldwide Interoperability for Microwave Access), UMTS (Universal Mobile Telecommunications System) or 3GPP LTE (Long Term Evolution). Femtocell BSs are connected to the operators' network via a virtual private network connection over a normal broadband internet connection like DSL.

The present invention focuses on femtocells based on the WiMAX and IEEE 802.16 standard. WiMAX is defined as World Wide Interoperability for Microwave Access based upon the standards family of IEEE 802.16. WiMAX is a time-synchronized communication technology in which frames have to be transmitted contemporaneously. The technology employed for data transmission in WiMAX communication networks is called OFDMA (Orthogonal Frequency Division Multiple Access), which is based on the usage of a large number of closely spaced orthogonal subcarriers. The OFDMA frame structure is divided by subcarriers in frequency domain, and by symbols in time domain. Users will be assigned a two dimensional (time and frequency domains) allocation, called "burst", to transmit/receive data.

One reason for the introduction of femtocells is the increase of operator network coverage and throughput/capacity for the sake of a better user experience and therewith to make a big step towards fixed-mobile-convergence. Like Wi-Fi access points, femtocells are designed to be deployed in home and office environments in order to give full indoor coverage in the respective area, and deployment of high density is expected in areas with high population or office density. However, the deployment of femtocells comes along with drawbacks of which one is interference effects between macro and femto levels of the network. Since femtocell BSs are often deployed in the same licensed spectrum as the wide area network of the operator, it is important to configure the radio interface correctly to avoid interference with other base stations. To this end, parameters such as transmit power, carrier frequency, and subcarrier assignments of femtocell base stations need to be carefully configured. For example, the transmit power should be high enough to ensure good signal strengths for its subscribers, but at the same time it should not be too high to avoid severe inference to other mobile stations, other femtocells and possible co-located macrocell base stations.

It is therefore an object of the present invention to improve and further develop a method for interference mitigation for femtocell base stations of a WiMAX network of the initially described type in such a way that, by employing mechanisms that are readily to implement, effective responses to various interference situations are possible.

In accordance with the invention, the aforementioned object is accomplished by a method comprising the features of claim 1. According to this claim, such a method is characterized in that said femtocell base station performs downlink measurements to detect neighboring macrocell and/or femtocell base stations and reports results of said downlink measurements to at least one higher layer network controller, wherein said network controller allocates transmission parameters to said WiMAX femtocell base stations on the basis of at least said reported measurement results and the current resource occupation in said network.

According to the invention it has been recognized that effective interference mitigation for various scenarios, i.e. in particular for various operational states of the femtocell base station (BS), can be achieved by the femtocell BS, in a first step, performing downlink measurements to detect neighboring macrocell and/or femtocell base stations. In a next step, the femtocell BS reports results of its downlink measurements to a higher layer network controller. The network controller, who has comprehensive knowledge of the current resource allocation in the network, allocates transmission parameters to the femtocell BS, thereby taking into consideration the specific network situation on the one hand, and the reported measurement results received from the femtocell BS on the other hand. Based on this information, the network controller can compromise between a transmission power that is high enough to ensure good signal strengths for the femtocell BS's subscribers, but that is not too high to avoid severe inference to mobile stations in neighboring femtocells or possible co-located macrocell base stations.

According to a preferred embodiment the downlink measurement and the reporting of measurement results is performed by the femtocell BS upon entering said network. More specifically, when a femtocell BS powers on, during the network entry, it may perform a downlink scan to detect and/or to sense neighboring macrocell BS and/or femtocell BSs.

The same procedure may be carried out in case a femtocell BS receives a request for a data connection from a mobile station. Since in this case the femtocell BS is expected to exchange data traffic with the mobile station, this is also an important situation in which a re-allocation of transmission parameters to the femtocell BS may be required in order to achieve high throughput while mitigating interference as far as possible. More specifically, when there is a request for a new data connection between a femtocell BS and a mobile station (MS), the higher layer network controller may take interference into account when it performs admission control, scheduling and resources allocation. This means that the higher network controller will keep the inference level as low as possible when establishing new data connection between the femtocell BS and a MS.

Similar to the procedure when a femtocell BS powers on, it will report its measurements to a higher layer network controller together with its new data traffic request. The higher layer network controller may allocate the appropriate transmission power, a set of subchannels and other transmission parameters to the femtocell BS who needs to send new data traffic based on current resource allocation, the femtocell BS's capability, and the received information from the femtocell BS.

Moreover, the procedure of downlink measurement and reporting of measurement results may be performed periodically during existing data connections or sessions, which might help to adjust the transmission parameters to the current situation and to actual needs. There are several ways to perform the measurements. For example, a femtocell BS can instruct its MSs to scan and report to the femtocell BS. The femtocell BS also can be designed to transmit and receive at the same time. The follow-up procedure, the reporting to the network controller and the allocation of transmission parameters may be similar as defined above. In this way, the resource can be used optimally, and the interference can be reduced.

Advantageously, the downlink measurements may include the scanning of received downlink preamble sequences. More specifically, the femtocell BS may scan the downlink preamble sequences to obtain information such as the index of the received preamble, received preamble strength, and other downlink transmission information.

The transmission parameters allocated by the network controller—which for instance might be an ASN (Access Service Network) gateway—to the femtocell base station may include the appropriate transmission power, the preamble sequence, and/or the set of subchannels. In addition to the reported measurement results and the current resource allocation in the network, the network controller may also consider the femtocell BS's capacity for allocating suitable transmission parameters.

According to a preferred embodiment the network controller checks whether Fractional Frequency Re-Use (FFR) and/or frequency segmentation is applied in macrocell base stations co-located to the femtocell BS. If it is applicable, the higher layer network controller may allocate the femtocell BS to a frequency reuse zone and/or frequency segment different to the one used in the macrocell sector covering the femtocell.

Additionally or alternatively, the network controller may check whether there are any carrier frequencies and/or subchannels that are not used neither by macrocell base stations co-located to the femtocell BS nor by neighboring femtocell base stations. If it is applicable, the higher layer network controller may assign the femtocell BS to a frequency carrier, which is different to the carriers used by the co-located macrocells and its neighboring femto-cells. Furthermore, if it is applicable, the higher layer network controller may allocate a set of subchannels to the femtocell BS which are different to those used by the co-located macrocell and other femtocell BSs according to the femtocell BS's location.

With respect to further transmission power optimization, a centralized or a distributed optimization approach may be realized. Concerning the centralized method it may be provided that the femtocell BS is configured to send dedicated transmission power testing preambles. These transmission power testing preambles may be designed to be distinguishable from other preambles used by macrocell/femtocell BSs, and they enable the femtocell BS to test its transmission power without disturbing macrocell and other femtocell BSs.

After identifying this special transmission power testing preambles, the MSs, other femtocell BSs and macrocell BSs know that this preamble is just used for the purpose of testing the femtocell's transmission power. Neighboring femtocell BSs and macrocell BSs may be configured to report the measurements of their MS(s) to the higher layer network controller. It's noted that neighboring femtocell BSs also can perform the measurement and report the measurement directly to the higher layer network controller. Then, the higher layer network controller will decide the femtocell BS's transmission power based on the measurement reports. In particular, the higher layer network controller can periodically allocate the transmission power and preambles, sets of subchannels and other transmission parameters to the femtocell BSs under its control.

With respect to facilitating the transmission parameter optimization process, it may be provided that the femtocell BSs of a network are grouped according to predefined criteria. There are several advantageous ways how to group the femtocell BSs, for example, the femtocell BSs can be grouped according to their geographic locations. Further, it may be provided that all femtocell BSs of a specific group are allocated the same transmission parameters, in particular the same transmission power.

Alternatively, according to a distributed approach, it may be provided that the femtocell BS, before increasing its transmission power for data transmissions, increases its transmission power on the preamble only and waits for the response of other macrocell and/or femtocell base stations.

Mobile stations that receive said femtocell BS's increased transmission power preamble may perform measurements on the preamble, and may report the measurement results to their own base stations. For instance, the measurements may include both the current preamble CINR (Carrier to Interference-plus-Noise Ratio) and the change of preamble CINR after the femtocell BS increases its transmission power on the preamble. Macrocell and/or femtocell base stations may be configured to vote on the femtocell BS's transmission power according to the measurement reports received from their mobile stations.

Advantageously, the femtocell BS is configured to inform the network controller of the termination of data connections with mobile stations. Upon being informed about the termination of an existing data connection between the femtocell BS and a MS, the higher layer network controller may release the resource to improve the spectrum efficiency while reducing the interference.

There are several ways how to design and further develop the teaching of the present invention in an advantageous way. To this end, it is to be referred to the patent claims subordinate to patent claim 1 on the one hand and to the following explanation of preferred embodiments of the invention by way of example, illustrated by the figure on the other hand. In connection with the explanation of the preferred embodiments of the invention by the aid of the figure, generally preferred embodiments and further developments of the teaching will we explained.

Figure 2:
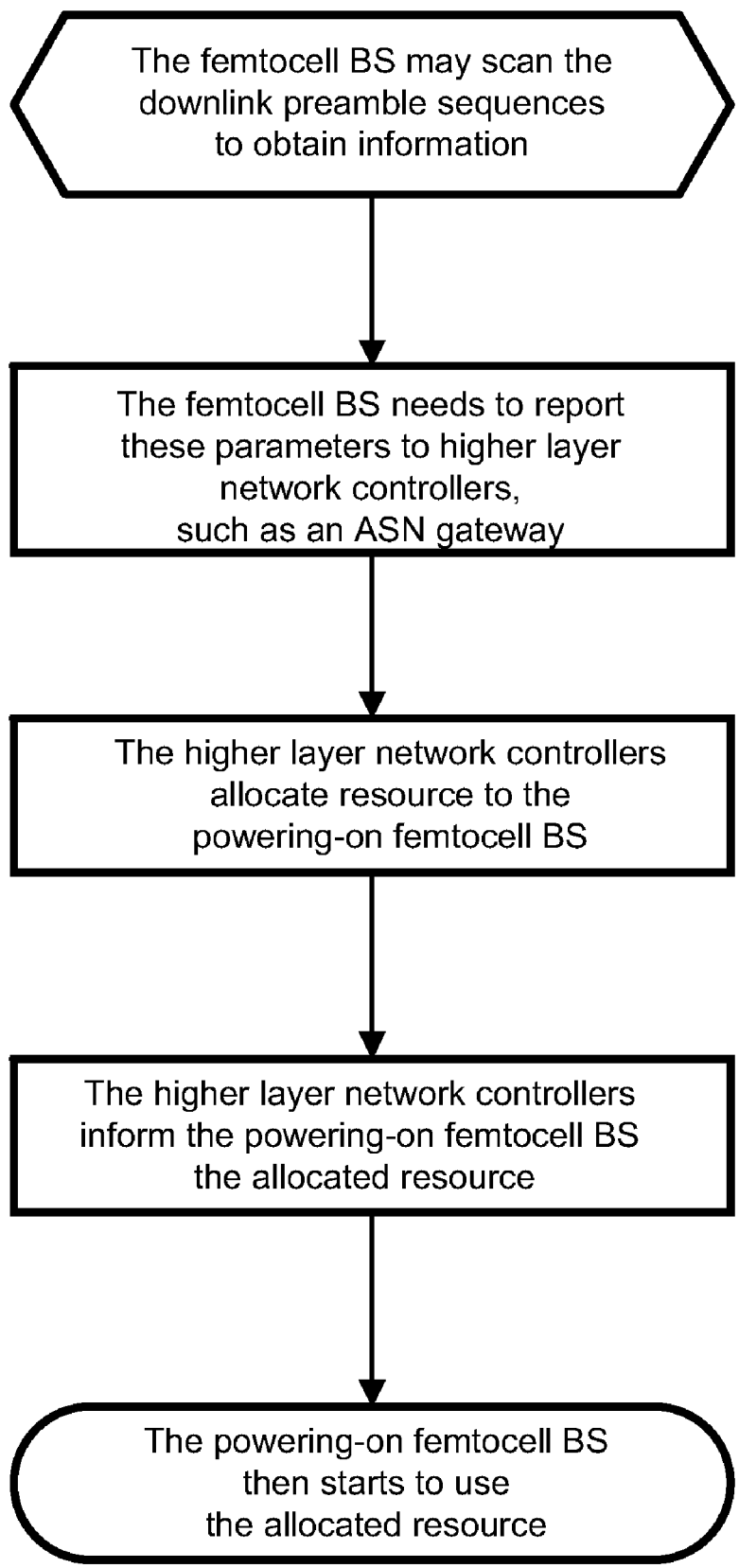
Figure 3:
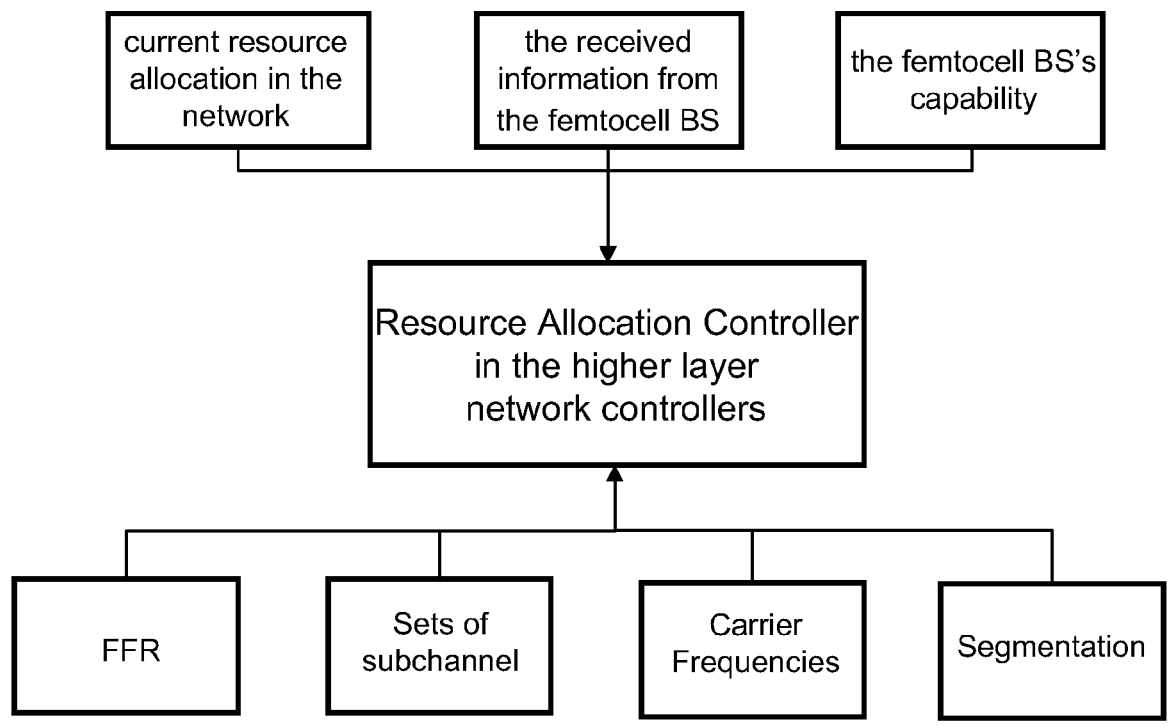
Figure 4:
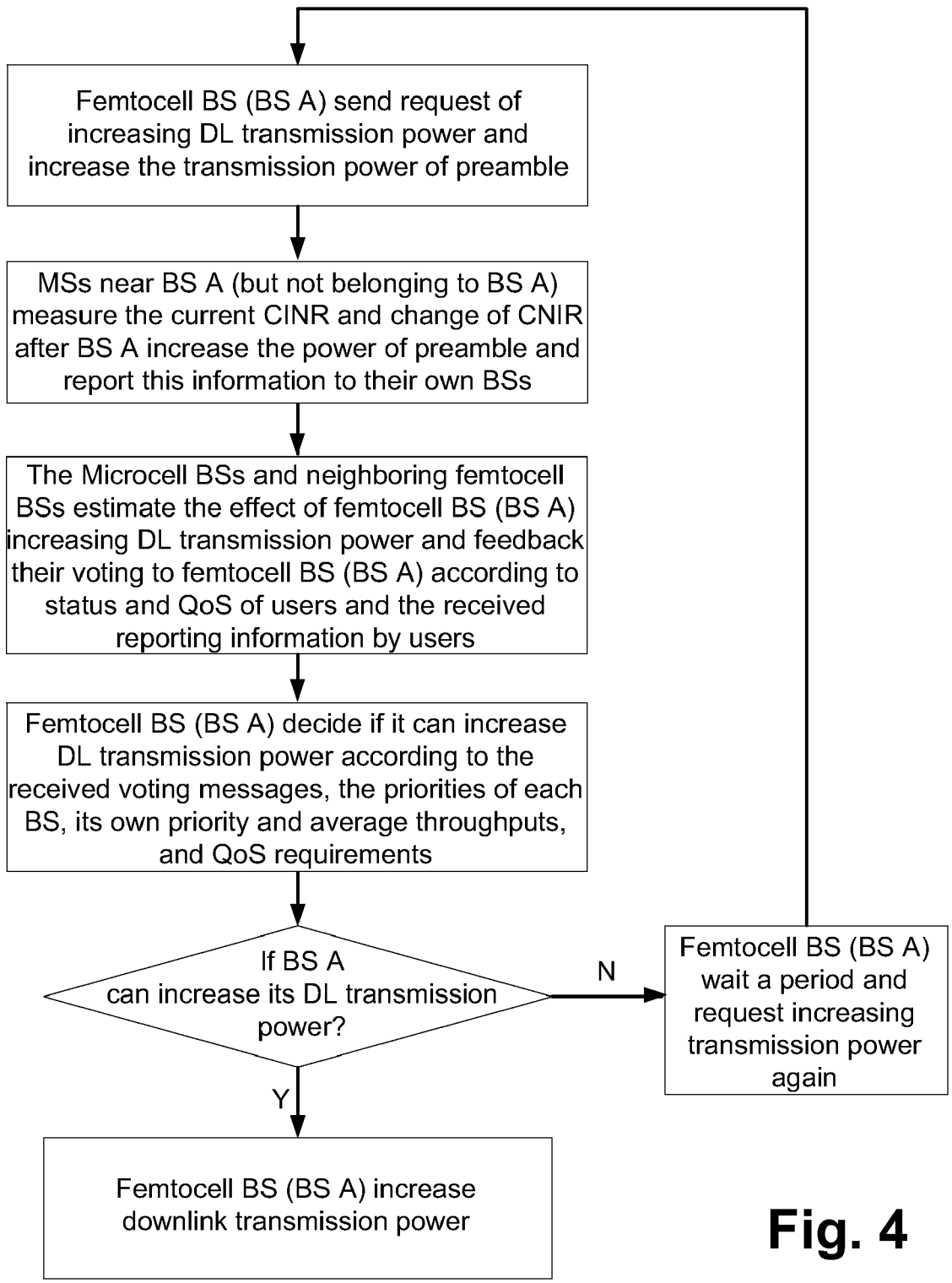

In the drawings:

FIG. 1 is a diagram generally illustrating four different scenarios in which interference mitigation techniques for femtocell base stations according to the present invention can be applied, FIG. 2 is a flow chart illustrating a method for interference mitigation when a femtocell base station powers on according to a first embodiment of the present invention, FIG. 3 is a diagram generally illustrating various factors being considered for resource allocation in a network controller according to another embodiment of the present invention, and FIG. 4 is a flow chart illustrating a femtocell base station requesting increase of its downlink transmission power according to still another embodiment of the present invention.

One of the major challenges for the deployment of WiMAX femtocells is how to avoid/minimize interference between co-located cellular networks, such as WiMAX macrocells and other femtocell BSs. FIG. 1 illustrates four main scenarios for a femtocell BS that particularly require interference mitigation techniques:
1. When a femtocell BS powers on
2. When there is a request for new data connection between a femtocell BS and a MS
3. During one or more data connection(s) between a femtocell BS and a MS
4. When there is a termination of an existing data connection between a femtocell BS and a MS FIG. 2 is a Flow Chart illustrating Interference Mitigation when a femtocell base station (BS) powers on. When the femtocell BS powers on, during the network entry, it performs a downlink scan to detect/sense neighboring macrocell/femtocell BSs. The femtocell BS scans the downlink preamble sequences to obtain information such as the index of the received preamble, received preamble strength, and other downlink transmission information. In a next step the femtocell BS reports these parameters to higher layer network controllers, such as an ASN (Access Service Network) gateway. The higher layer network controllers allocates the appropriate initial transmission power, preamble sequence, sets of subchannels and other transmission parameters to the powering-on femtocell BS based on current resource occupation in the network, the femtocell BS's capabilities, and the received information from the femtocell BS, which is illustrated in the upper part of FIG. 3.

When allocating resources to the femtocell BS, in the embodiment illustrated in FIG. 2 the higher layer network controller further considers the following factors, which are illustrated in the lower part of FIG. 3:
1. It checks whether FFR (Fractional Frequency Re-Use) and/or frequency segmentation are applied in co-located the WiMAX macro-cells. If it is applicable, the higher layer network controller allocates the femtocell BS to a frequency reuse zone and/or frequency segment different to the one used in the macrocell sector covering the femtocell BS.
2. It checks whether there are any other carrier frequencies that are not used by the macro-cells co-located to the femtocell BS and the femtocell BS's neighboring femtocells.

If it is applicable, the higher layer network controllers assign the femtocell BS to a frequency carrier which is different to the carriers used by the co-located macrocells and its neighboring femtocells.
3. If it is applicable, the higher layer network controllers allocate a set of subchannels to the femtocell BS which are different to those used by the co-located macrocell and other femtocell BSs according to the femtocell BS's location.

During operation the transmission power of the femtocell BS can be optimized via several methods, which basically can be classified into two categories: centralized and distributed. FIG. 4 is a flow chart illustrating a femtocell base station requesting increase of its downlink (DL) transmission power, whereupon a distributed transmission power optimization method is being applied.

In the embodiment of FIG. 4 the femtocell BS needs to increase its DL transmission power since it requires to send more data traffic. Generally, in the embodiment of FIG. 4 It is provided that the macrocell base stations and neighboring femtocells can vote on the femtocell BS's transmission power with different weights according to the metrics reported by their own MSs. If the voting result is negative, the femtocell BS has to change its planned transmission power increase. The flow chart of this procedure is shown in detailed steps in FIG. 4:
1. When a specific femtocell BS—in the sequel referred to as femtocell BS (BS A)—needs to increase its transmission power to a certain level, firstly it only increases its transmission power on the preamble and waits for the response of other BSs. Furthermore, a message is broadcasted to inform its neighbors that femtocell BS (BS A) will attempt to change its downlink transmission power level;
2. When a MS, which is located near femtocell BS (BS A) but does not belong to it, receives the message of changing DL transmission power of neighboring femtocell BS (BS A), it measures both the current preamble CINR (Carrier to Interference-plus-Noise Ratio) and the change of preamble CINR after the femtocell BS (BS A) increases its transmission power on the preamble, and reports the results to its own BS;
3. The macrocell BSs and neighboring femtocell BSs estimate the effect of the femtocell BS (BS A) increasing its DL transmission power and send their votes to femtocell BS (BS A) according to the status and QoS of users and the reported information by their users. The voting message may include average throughput information and BSs' options of increasing power by the femtocell BS (BS A). This option may have several levels. For example, it may be a number selected from 1 to 5, and 1 means strongly disagree and 5 means totally agree. This voting message can be sent by air and/or via the backhaul;
4. The Femtocell BS (BS A) decides if it can increase its DL transmission power according to the received voting messages, the priorities of each BS who gives feedback message, its own priority and average throughputs, QoS requirements, etc. Usually, macrocells BSs have the highest priorities and if any macrocells BSs have negative options, the femtocell BS (BS A) shall not increase its DL transmission power. If a positive decision is obtained, the femtocell BS (BS A) can increase downlink transmission power. If the femtocell BS (BS A) cannot increase its DL transmission power, it may wait a period and try to request to increase its DL transmission power again.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:
1. Method for interference mitigation for femtocell base stations of a Worldwide Interoperability for Microwave Access (WiMAX) network, wherein said femtocell base station is located within the transmission range of at least one macrocell base station and/or at least one other femtocell base station, characterized in that said femtocell base station performs downlink measurements to detect neighboring macrocell and/or femtocell base stations and reports results of said downlink measurements to at least one higher layer network controller, wherein said network controller allocates transmission parameters to said WiMAX femtocell base stations on the basis of at least said reported measurement results and the current resource occupation in said network.

2. Method according to claim 1, wherein said downlink measurement and said reporting of measurement results is performed by said femtocell base station upon entering said network.

3. Method according to claim 2, wherein said downlink measurement and said reporting of measurement results is performed each time said femtocell base station receives a request for a data connection from a mobile station.

4. Method according to claim 1, wherein said downlink measurement and said reporting of measurement results is performed each time said femtocell base station receives a request for a data connection from a mobile station.

5. Method according to claim 1, wherein said downlink measurement and said reporting of measurement results is performed periodically during existing data connections.

6. Method according to claim 1, wherein said downlink measurements include the scanning of received downlink preamble sequences.

7. Method according to claim 1, wherein the transmission parameters allocated by said network controller to said femtocell base station include the transmission power, the preamble sequence, and/or the set of subchannels.

8. Method according to claim 1, wherein said network controller checks whether Fractional Frequency Re-Use (FFR) and/or frequency segmentation is applied in macrocell base stations co-located to said femtocell base station.

9. Method according to claim 1, wherein said network controller checks whether there are any carrier frequencies and/or subchannels that are not used neither by macrocell base stations co-located to said femtocell base station nor by neighboring femtocell base stations.

10. Method according to claim 1, wherein said femtocell base station is configured to send dedicated transmission power testing preambles.

11. Method according to claim 10, wherein macrocell and/or femtocell base stations co-located to said femtocell base station, upon identifying said dedicated transmission power testing preambles, report their related measurements to said network controller.

12. Method according to claim 11, wherein said network controller adjusts said femtocell base station's transmission parameters, in particular its transmission power, based on the received measurement reports.

13. Method according to claim 1, wherein femtocell base stations of said network are grouped according to predefined criteria, in particular their geographic location, and wherein all femtocell base stations of a specific group are allocated the same transmission parameters.

14. Method according to claim 1, wherein said femtocell base station, before increasing its transmission power, increases its transmission power on the preamble only and waits for the response of other macrocell and/or femtocell base stations.

15. Method according to claim 14, wherein mobile stations that receive said femtocell base station's increased transmission power preamble perform measurements on said preamble and report the measurement results to their own base stations.

16. Method according to claim 15, wherein macrocell and/or femtocell base stations are configured to vote on said femtocell base station's transmission power according to the measurement reports received from their connected mobile stations.

17. Method according to claim 1, wherein said femtocell base station is configured to inform said network controller of the termination of data connections with mobile stations.

* * * * *

UNITED STATES PATENT AND TRADEMARK OFFICE
CERTIFICATE OF CORRECTION

PATENT NO. : 8,412,221 B2  Page 1 of 1
APPLICATION NO. : 13/144615
DATED : April 2, 2013
INVENTOR(S) : Fan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 85 days.

Signed and Sealed this
First Day of September, 2015

Michelle K. Lee
*Director of the United States Patent and Trademark Office*